United States Patent [19]

von Blücher et al.

[11] 4,455,187

[45] Jun. 19, 1984

[54] FILTER SHEET MATERIAL AND METHOD OF MAKING SAME

[76] Inventors: Hubert von Blücher, Freytagstrasse 45; Hasso von Blücher, Sohnstrasse 58, both of D-4000 Düsseldorf; Ernst de Ruiter, Hohënstrasse 57a, D-5090 Leverkusen 3, all of Fed. Rep. of Germany

[21] Appl. No.: 411,737

[22] Filed: Aug. 26, 1982

[30] Foreign Application Priority Data

Mar. 27, 1982 [DE] Fed. Rep. of Germany ....... 3211322

[51] Int. Cl.$^3$ .......................... B41C 1/06; B32B 31/20
[52] U.S. Cl. .................... 156/277; 427/211; 427/288; 427/286; 427/265; 156/320; 428/196; 428/206; 428/244; 428/323; 427/210
[58] Field of Search .............. 428/196, 206, 244, 323, 428/341, 911; 427/265, 288, 286, 210, 211, 244; 210/502, 504, 506, 507; 55/387, 504; 156/320, 277

[56] References Cited

U.S. PATENT DOCUMENTS

| | | | |
|---|---|---|---|
| 1,118,516 | 11/1914 | Stifel | 428/196 |
| 2,029,768 | 2/1936 | Ferguson et al. | 427/210 X |
| 3,413,982 | 12/1968 | Sublett et al. | 131/266 |
| 3,502,537 | 3/1970 | Pearson et al. | 55/524 |
| 3,533,825 | 10/1970 | Bohrer et al. | 55/524 |
| 4,086,112 | 4/1978 | Porter | 156/277 X |
| 4,190,696 | 2/1980 | Hart et al. | 210/502 X |

*Primary Examiner*—George F. Lesmes
*Assistant Examiner*—Nancy A. B. Swisher
*Attorney, Agent, or Firm*—Sprung, Horn, Kramer & Woods

[57] ABSTRACT

The invention relates to a filter sheet material composed of an air-permeable, flexible, especially textile supporting layer, on which there is imprinted in a certain pattern a mixture containing an adsorbent in powder form and a polymeric binding agent, the adsorbent covering up to 90% of the surface of the supporting layer. The invention furthermore relates to the use of such filter sheet materials with active carbon as adsorbent for protective clothing, and to the preparation of the material by rotary screen printing from a paste made of the powdered adsorbent and a dispersion of the polymeric binding agent.

13 Claims, No Drawings

FILTER SHEET MATERIAL AND METHOD OF MAKING SAME

BACKGROUND

Flexible filter sheet materials are needed for a wide variety of technical purposes, such as aircraft construction, medical apparatus, water purification and air conditioning equipment, to prevent the passage of toxic or harmful vapors and gases. Another important field of application is protective clothing and the like, which as a rule contains a layer of material for absorbing chemical poisons. Typical examples are polyurethane foams and mats charged with a mixture of finely ground active carbon and a binder dispersion. These known flexible filters have the great disadvantage that they are washable only to a limited extent and, on account of their laminated construction, they impair the exchange of air required by the skin and consequently result in a build-up of heat. If foam is used as the supporting material, there is an irregularity of coverage due to the pores of the foam and hence an irregularity of the filtration effect which then varies widely.

German Pat. No. 2,951,827 discloses a material for protection against chemicals and brief exposure to heat, which consists of an air-permeable, flexible supporting layer bearing on one or both sides grains of adsorbent of a diameter of approximately 0.5 mm on pillars of a hardened adhesive. These permeable sheet materials satisfy a great number of requirements, but they are difficult to make and, on account of the granular adsorbent they require, e.g., finely granular active carbon, they are relatively expensive. In many cases, irregular charging causes the adsorber particles to contact one another in movement, which results in attrition.

Sheet filter materials made from carbonized fabric are extremely expensive and cannot withstand mechanical stress. Combining them with other supports is of no more than limited usefulness.

THE INVENTION

The invention is addressed to the problem of applying the adsorbent particles to an air-permeable, flexible sheet material such that a very precisely determined amount is distributed very uniformly in order to achieve a high permeability, a very uniform filtration per unit area, an accordingly good protective effect, and low attrition. In addition, the improved sheet filter material is to have a low bulk and permit washing without loss of quality.

This is accomplished in accordance with the invention by imprinting the air-permeable, flexible supporting layer with a mixture of powdered adsorbent and a polymeric binding agent in a certain pattern covering up to 90% of the surface of the supporting layer.

The adsorbents for the purposes of the invention are known adsorbing materials, such as for example silica xerogels, metal oxides and hydroxides, especially aluminum oxide and hydroxide, molecular sieves, ion exchangers, and active carbons from various sources. The active carbon can be prepared in a known manner from suitable organic materials. A very useful active carbon is obtained, for example, by the carbonization of ion exchangers based on polystyrene, followed by activation with steam. The internal and external surface of the adsorbents can be charged with additives, such as heavy metal catalysts or fire-retardant, antibacterial or fungicidal substances.

In order to assure a high degree of effectiveness, the powdered adsorbent is very finely ground and has a particle size of only 0.1 to 50 $\mu$m, preferably 1 to 10 $\mu$m. With jet mills it is possible to reduce active carbon, for example, to 95% less than 3 $\mu$m. Such active carbons can have predetermined pore sizes with a very high active surface area of up to 1,400 m$^2$/g.

In processing and application it may be very desirable to envelop the adsorbent particles, especially active carbon particles, in a thin coating of polymers having a selective permeability for the substances that are to be adsorbed. It has been possible, by treating active carbon particles with acrylate dispersions, e.g., BASF's Acronal 50D and 27D, to envelop the particles in a film of macromolecules which is permeable to chemical warfare agents but not to printing adjuvants. Another possibility for encapsulating the adsorbent grains consists in floating them turbulently with polyamide powder of very uniform particle size in a two-component blower and blasting them through a gas flame tubular oven against a chilled steel plate with a mirror-finish chromium plating. The polyamide softened in the gas flame tubular oven wraps itself around the adsorber particles in the air stream and solidifies upon emergence from the flame tube into the cooled air stream. Adhesion between the adsorbent grains thus encapsulated in polyamide is counteracted by impact against the mirror-chromed steel plate chilled to approximately $-15°$ C. Other known processes for the microencapsulation of the adsorbent grains with various inorganic or organic envelope materials can likewise be used.

The pattern imprinted in accordance with the invention onto the permeable, flexible supporting layer contains, in addition to the powdered adsorbent, a polymeric binding agent and, if desired, other additives such as, for example, fire retardants or printing adjuvants. For the purposes of the invention, a great variety of polymeric binding agents can be used, such as for example polyurethanes, polyacrylates and elastomers. The latter can also be halogenated, especially chlorinated or fluorinated. Also very suitable are fusion adhesives based on polyamides, polyesters or ethylene-vinyl acetate copolymers (EVA). When the printing is performed the polymeric binding agents and the fusion adhesives are usually in the form of a dispersion. But then, in the printed pattern, only the polymeric, solidified (e.g., cross-linked or vulcanized) binding agents remain. Their proportion in the printed adsorbent pattern amounts to from 20 to 200, preferably 50 to 100%, by weight, with respect to the adsorbent.

The adsorbent bound to the pattern imprinted on the air-permeable, flexible support covers preferably 20 to 80%, especially 30 to 70%, of the surface of the support. It can contain up to 250 g of adsorbent per square meter. The preferred amounts are 20 to 150 g of adsorbent per square meter. The printed pattern of the bound adsorbent can be composed of dots or lines. The geometry important to the adsorption and the proportion of unprinted surface providing for air-permeability are determined by the selection of the stencil. The amount applied is constant within a few percent and is uniformly distributed over the entire width of the goods. The printed pattern of the bound adsorbent has a thickness of 0.05 to 1 mm. The dots or spots can have a diameter of 0.1 to 5 mm, but preferably of only 0.2 to 1.5 mm. Printed lines have approximately the same width as the diameter of the dots. Their length is determined only by the stencil. For certain applications, such as protection against microwave, it may be very desirable to print a continuous mesh pattern of a conductive adsorbent such as active carbon. This mesh pattern can be obtained by printing, drying and, if desired, solidification of a line pattern, and then, in an additional procedure, printing a line pattern substantially perpendicular to the first pattern, so as to produce ultimately the pattern of a continuous mesh. For conductivity purposes the adsorptive action of the printed material is not essential, and it can also be graphite or metal dust. These substances can also be added to the mixture of conductive or nonconductive adsorbent and binding agent.

The air-permeable, flexiable support material can be imprinted not only on one side but also on both sides, and the adhesive action of the polymeric binding agent prior to its solidification can be utilized to produce a laminate having an interrupted coating of the regularly imprinted pattern of the bound adsorbent of up to 1 mm thickness between two flexible, air-permeable support layers. Then the carbon knubs, for example, are situated between two webs and are better protected. This laminate can be made by running in an addtional supporting web after the first has been imprinted, then drying the sandwich and bonding the webs together by the action of pressure and heat. In like manner, a laminate can be prepared for certian applications containing two open layers of the printed pattern of the bound adsorbent between three flexible, air-permeable support layers.

The flexible, air-permeable support for the filter sheet material of the invention can also be a wire fabric for certain technical applications, but for most applications, especially for the production of protective clothing, it is, as a rule, a textile fabric of mineral, synthetic or natural fibers. Woven or knit fabrics are especially preferred on account of their slight thickness combined with high strength. The selection of the supporting textile is governed by the desired application. In the case of light protective clothing, a laminated material or mixed fabric of cotton and mineral fibers is recommendable, in which the mineral fiber side is provided with the printed pattern of the bound adsorbent. Also the simultaneous interweaving of these materials is outstandingly suitable. Also the incorporation of fire-retardant fibers or particularly breakage-resistant fibers, such as aramids (KEVLAR, NOMEX) or polyimides, respectively, can be very useful for certain applications. It is important that the textile sheet material, especially the woven fabric, have a sufficient permeability for air, so that the filter sheet material of the invention, after imprinting with the bound adsorbent and after as much as 90% of the surface of the support has been covered with it, will have a permeability to air at 10 mm water column of 50 or 100 to 5000, preferably 500 to 1000, liters per square meter per second.

The filter sheet material of the invention is prepared by applying a paste of the powdered adsorbent, a solution or dispersion of the polymeric binder and conventional printing adjuvants if desired, to the air-permeable, flexible supporting layer in a certain pattern by rotary screen printing, and drying and solidifying it.

The polymeric binding agent is used in the form, for example, of polyurethane or polyacrylate latices, or a latex of halogenated or nonhalogenated elastomers such as natural, synthetic or silicone rubber, chloroprene or fluoroprene. Then, after the printing, the drops or stripes of the bound adsorbent applied in a certain pattern must be dried to remove the volatile components of the latex. Depending on the chemical nature of the binding agent, they can then be exposed to pressure and/or heat so as to become solidified, i.e., cross-linked or vulcanized.

Fusion adhesives, especially on the basis of polyamides, polyesters or EVA, can be used not only in dispersion form but also in dry powder form. Then the printed spots of adsorbent and fusion adhesive must be exposed briefly to thermal radiation immediately after printing, before theprinted web moves to the so-called drying run for final solidification.

In the printing of a finely powdered adsorbent material, the difficulty is encountered that printing adjuvants are needed for a perfect screen printing. Unless special precautions are taken, however, these adjuvants are absorbed by the adsorbent, e.g., the active carbon. This would have the disadvantage not only that the printing adjuvants would fail to function properly, but also that the pores of the adsorbent might become blocked. The adsorbent, especially active carbon, must therefore be protected against the components which are necessary in order to print the adsorbent power in a thickness of up to 1 mm and fix it on the support.

This can be accomplished by the encapsulation described above, i.e., by envelopment with inorganic or organic macromolecules. The thickness of this film can be on the order of magnitude of the diameter of the macromolecule, and can be as great as the particle size, i.e., in the micrometer range, inasmuch as these films are, as a rule, porous. In any case, the thin encapsulating films on the adsorbent particles are to have a selective permeability such that they are permeable to the substances to be absorbed, such as chemical-warfare agents, but not to printing adjuvants, sweat, detergents, fats and oils. This is important when such filter sheet materials are used in the building up of multi-layer protective suits so as to prevent inactivation due to being worn for long periods while engaging in strenuous physical activity, and to assure a high and long-enduring protection against poison gases, etc. The encapsulation of carbon particles can be performed not only by the processes described above, but, for example, by continuously adding very small amounts of appropriate latices, e.g., an acrylate dispersion, to the carbon powder while keeping the latter in constant movement. These latices then coagulate on the surface of the powder particles.

If the above-named latices or dispersions serve as binding agents, good protection against the printing adjuvants can be achieved by first filling the pores of the adsorbent powder with water and then mixing the powder with the aqueous dispersion of the binding agent, and adding the printing adjuvants immediately before printing. The adsorbent, especially active carbon, can be charged also with other relatively easily absorbable substances such as isopropyl alcohol, for example, which, when the pastes are prepared and during the printing, fill the pores and thus lock out unwanted substances, but evaporate when the printed pattern is dried and heated, leaving an open pore system. Also suitable as products having this kind of protective function are volatile substances which are not miscible with the printing adjuvants. If a paste is used which is prepared on the basis of "high solids", i.e., pre-polymerized, masked isocyanates, to which an aromatic triamine is added as crosslinking agent (Bayer), an additional effect is achieved by pre-treatment with isopropyl alcohol. After printing at room temperature, the web is passed through a drying run in which the temperature increases to 170° C. Since the solidification of the "high solids" starts at 135° to 140° C. there exists the danger of penetration into the pores. If the active carbon, however, is pre-treated with isopropyl alcohol, the escaping alcohol leaves a porous structure which promotes adsorption, but resistance to attrition does not suffer.

If the adsorbent powder is appropriately pre-treated in the manner described, especially by encapsulation, it is thus possible also to print pastes or adsorbents onto a supporting layer and then, by drying and solidifying the binding agent, an adsorbent is obtained which nevertheless has a very high, virtually unimpaired adsorption capacity. The amount of the printing paste to be applied to the supporting layer is determined especially by the stencil of the rotary screen printing apparatus. Stencils of 10 to 24 mesh and a thickness of 0.5 to 1.5 mm have proven especially practical.

The filter sheet materials having a supporting layer of textile material pursuant to the invention, are especially suitable for use in making protective suits for protection against CBR weapons or for industrial protection. Such protective suits will then be made up usually of multiple layers having outer layers of fire-retardant, water- and oil-repellent woven or knit fabrics or of a nonwoven fabric made from mineral fibers, and a laminate composed of one or more layers of the printed, bound adsorbent between air-permeable, textile sheet materials.

The invention will now be illustrated by the following example:

EXAMPLE

A cotton fabric of approximately 100 g/m$^2$ weight, with an air-permeability of 1,100 liters per square meter per second at 10 mm water column was imprinted in a rotary coating apparatus (14 mesh special stencil) with a paste of 1 part of a pulverized active carbon, 1.5 parts of water, 1 part of an acrylate dispersion of 50% solid content, 0.02 parts of a commercial thickening agent, 0.01 part of concentrated ammonia, and 0.1 part of a fire-retardant combination. The product had approximately 40 active carbon knubs of 0.3 mm height and 1 mm diameter per square centimeter, and a total air permeability of 430 liters per square meter per second. The total coating of active carbon and acrylate binder amounted to 170 g/m$^2$. The capacity for adsorbing mustard gas complied with the current requirements for material for protection against ABC weapons. The wear resistance in the practical testing was very satisfactory.

It will be understood that the specification and example are illustrative but not limitative of the present invention and that other embodiments with the spirit and scope of the invention will suggest themselves to those skilled in the art.

What is claimed is:

1. A process for making a filter sheet material which comprises mixing a paste of a powdered absorbent having a particle size of about 0.1 to 50 μm with a solution or dispersion of a polymeric binding agent comprising at least one member selected from the group consisting of polyurethanes, polyacrylates, halogenated or halogen-free elastomers, fusible polyamides, fusible polyesters and fusible ethylenevinyl acetate copolymers thereby to form a composition, printing the composition on at least one surface of a porous textile sheet material in discrete areas to a height of about 0.05 to 1 mm and a width of about 0.1 to 5 mm, the discrete areas covering up to about 90% of the surface with unprinted areas separating the discrete printed areas, the powdered absorbent being applied in about 20 to 250 g/m$^2$ and the polymeric agent being present in about 20 to 200% of the weight of the adsorbent, and drying the textile sheet material, the resulting filter sheet material having an air permeability under a 10 mm water column of about 50 to 5000 liters per square meter per second.

2. A process according to claim 1, wherein the print comprises zones having a width of about 0.1 to 1 mm.

3. A process according to claim 1, wherein the print covers about 20 to 80% of at least one surface.

4. A process according to claim 1, wherein the composition further contains a fire-retardant.

5. A process according to claim 1, wherein the adsorbent comprises active carbon.

6. A process according to claim 7, wherein the composition comprises particles of adsorbent enveloped by a thin coating of the polymeric binding agent which agent is selectively permeable to substances to be adsorbed by the adsorbent.

7. A process according to claim 1, wherein the support layer is printed on both surfaces.

8. A process according to claim 1, including a further support layer of air-permeable flexible material bonded on the printed surface of the first support layer.

9. A process according to claim 1, wherein the adsorbent is conductive and the composition is printed in a continuous mesh pattern.

10. A process according to claim 1, wherein printing is effected employing a rotary screen of about 10 to 24 mesh and having a thickness of about 0.5 to 1.5 mm.

11. A process according to claim 1, wherein printing is first effected in a pattern of discontinuous lines and is thereafter effected in a second pattern of lines intersecting the first so as to form a continuous mesh network.

12. A process according to claim 1, wherein immediately after printing of the textile sheet material a second textile sheet material is superposed on the print, and the composite structure is subjected to heat and pressure to effect drying and bonding into a laminate.

13. A process according to claim 1, wherein the adsorbent is present in about 20 to 150 g/m$^2$, the discrete printed areas have a width of about 0.2 to 1 mm, the discrete printed areas covering about 30 to 70% of the surface, the polymeric binding agent being present in about 50 to 150% of the weight of the adsorbent, the filter sheet material having an air permeability under a 10 mm water column of about 500 to 1000 liters per square meter per second.

* * * * *